Nov. 21, 1933.                W. H. BAUCH                1,936,345
                       PORTABLE SOUND PICTURE APPARATUS
                        Original Filed Aug. 23, 1930
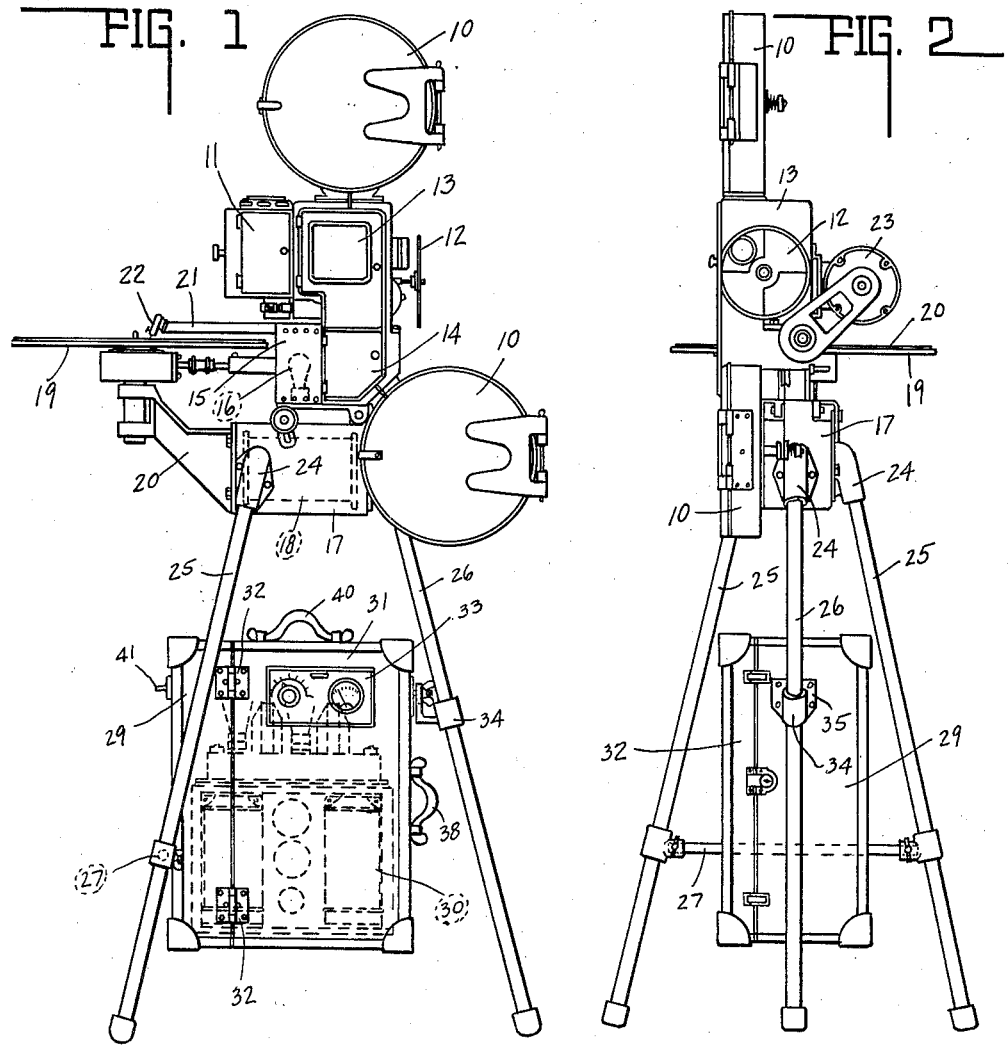
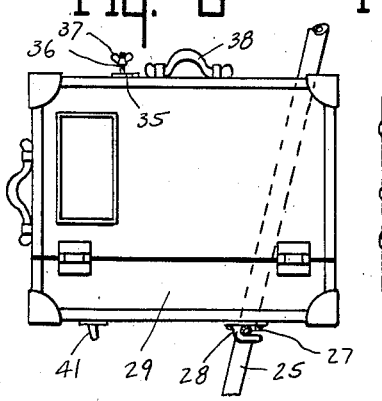
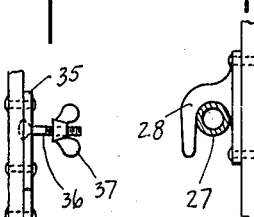
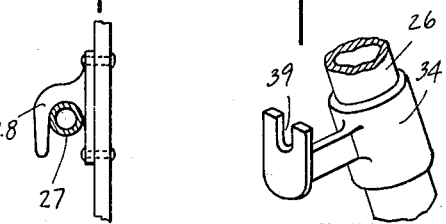
INVENTOR.
WILLIAM H. BAUCH.
BY
                                              ATTORNEYS.

Patented Nov. 21, 1933

1,936,345

UNITED STATES PATENT OFFICE 1,936,345

PORTABLE SOUND PICTURE APPARATUS

William H. Bauch, Shelbyville, Ind., assignor, by mesne assignments, to United Aircraft Products, Inc., Dayton, Ohio, a corporation Application August 23, 1930, Serial No. 477,199
Renewed April 12, 1933

8 Claims. (Cl. 88—16.2)

This invention relates to a portable sound picture apparatus.

The principal object of the invention is to produce a portable apparatus of this type wherein the constituent parts may be disassembled for transportation and may be quickly and easily reassembled in a manner providing the greatest stability for the assembled apparatus.

According to the invention, the projector and associated attachments form a single unit, while the amplifier apparatus forms a second unit. Detachable supporting legs are provided for the projector unit, and the amplifier unit is fastened thereon when assembled in such manner as to stabilize the entire apparatus.

Another feature of the invention resides in the fact that the transformer for supplying exciter current, which is one of the heaviest parts of the projecting unit, is located in a casing to which the detachable legs are fastened and the said casing acts as a support for the projector unit. By this means the weight of the transformer is located in a manner to assist the stabilizing of the device.

Another feature of the invention resides in the fact that the amplifier unit is permanently installed in a travelling case equipped with convenient carrying means and the said case is mounted upon the supporting legs of the device without removal of the amplifier mechanism therefrom.

Another feature of the invention resides in the special means employed for mounting the amplifier case upon the supporting legs.

Other objects and features of the invention and the full nature thereof will be understood from the following specifications and claims and the attached drawing.

Fig. 1 is a side elevational view of the apparatus completely assembled. Fig. 2 is a front elevational view of the same. Fig. 3 is a fragmentary view showing one position of the amplifier case during the assembling of the apparatus. Fig. 4 is an elevational view partly in section showing certain of the clamping means for fastening the amplifier case to the supporting legs. Fig. 5 is a perspective view of a fitting carried by one of the legs and adapted to cooperate with the clamping means shown in Fig. 4. Fig. 6 is an elevational view partly in section showing another fitting used in the assembly of the amplifier case upon the supporting legs.

In the drawing there is shown a motion picture projector apparatus having the usual film magazines 10, lantern 11, and shutter 12. The usual form of film manipulating mechanism, not shown, is carried in a housing 13. A housing 14 carries the usual photo-electric cell and associated apparatus for producing a varying electric-current from a sound record carried upon the film. A housing 15 carries an exciter bulb 16 for exciting the photo-electric cell. The entire apparatus, so far described, is supported upon a casing 17 in which is carried the transformer 18 for supplying current to the exciter bulb 16. A turn table 19 is carried upon a bracket 20 also supported upon the casing 17. The said turn table is adapted to carry the disc-type of sound record and is provided with the usual tone arm 21 and an electric pickup 22. The film manipulating mechanism and turn table 19 are driven by an electric motor 23 mounted upon one side of the housing 13. The case 17 has fastened thereto a plurality of sockets 24 into which are inserted a pair of rear supporting legs 25 and a front supporting leg 26. The said supporting legs are preferably simply inserted in the sockets 24 but may be fastened by suitable clamping means if desired.

A cross-bar 27 is detachably secured to the rear legs 25 and is engageable by one or more hook-shaped members 28 fastened to a travelling case 29 in which is permanently installed amplification mechanism 30, indicated by dotted lines in Fig. 1. The travelling case 29 is equipped with a closure 31 mounted upon hinge 32 and carrying suitable controlled instruments 33. The said closure provides access to the amplification unit when necessary. A socket member 34 is permanently attached to the legs 26. A plate 35 is fastened to one face of the travelling case 29 and carries an outwardly projecting screw 36 provided with a wing nut 37. In assembling the case 29 upon the legs 25 and 26, the case is first lifted by means of a handle 38 and is rested upon the cross-bar 27 with the hook-shaped members 28 engaging the said cross-bar as illustrated in Fig. 3. The case 29 is then rotated about the cross-bar 27 until it reaches the position illustrated in Fig. 1 in which position the screw 36 engages socket 39 in the socket member 34. The wing nut 37 is then screwed home to clamp the socket member 34 against the plate 35. To assist in this movement of the case 29, a second handle 40 is provided. Electrical connections, not shown, are then made between the pickup 22, photo-electric cell and amplifier 30, between the transformer 18 and a suitable current supply and between the amplifier 30, a current supply and suitable sound reproducing apparatus. The case 29 is also fitted with a foot 41 projecting therefrom the same distance as the hook-shaped members 28 to provide a suitable rest when disassembled.

By means of this construction the relatively heavy amplifier 30 and case 29 are firmly attached to the legs 25 and 26 in such a position that the combined center of gravity of the entire apparatus is relatively low. By means of this connection also any appreciable relative movement between the legs is prevented and thus the assembled apparatus has a great inherent stability. By locating the relatively heavy transformer 18 in the casing 17 this stability is increased. In addition the assembling and disassembling of the outfit for transportation is extremely simple. When disassembled the projection apparatus and sound attachments form a unit which may be carried in a single travelling case. The amplifier unit is permanently installed in its travelling case and the detachable legs and cross-bar 27 may be strapped to either case.

The invention claimed is:

1. In a portable sound picture apparatus, the combination of a motion picture projector having an attachment for producing varying electric currents from a sound record, supporting legs therefor, a case, amplifying means for said electric currents permanently installed in said case, and means for detachably securing said case to said supporting legs beneath the remainder of the apparatus supported by said legs.

2. In a portable sound picture apparatus, the combination of a motion picture projector having an attachment for producing varying electric currents from a sound record, supporting legs therefor, a case, amplifying means for said electric currents permanently installed in said case, a substantially horizontal cross bar secured to two of said legs, one or more hook-shaped members carried by said case and adapted to engage said cross bar, and means for detachably securing said case to another of said legs at another point.

3. In a portable sound picture apparatus, the combination of a motion picture projector having an attachment for producing varying electric currents from a sound record, supporting legs therefor, a case, amplifying means for said electric currents permanently installed in said case, a substantially horizontal cross bar secured to two of said legs, one or more hook-shaped members carried by said case and adapted to engage said cross bar, a socket member carried by another of said legs, and a member carried by said case for engaging said socket member.

4. In a portable sound picture apparatus, the combination of a motion picture projector having an attachment for producing varying electric currents from a sound record, supporting legs therefor, a case, amplifying means for said electric currents permanently installed in said case, a substantially horizontal cross bar secured to two of said legs, one or more hook-shaped members carried by said case and adapted to engage said cross bar, a socket member carried by another of said legs, and a clamp member carried by said case for engaging and clamping said socket member.

5. In a portable sound picture apparatus, the combination of a motion picture projector having an attachment for producing varying electric currents from a sound record, an exciter lamp, a transformer for supplying alternating current of the proper voltage to said lamp, a casing for said transformer, said casing forming a support for said projector and attachment, and supporting legs detachably secured to said casing.

6. In a portable sound picture apparatus, the combination of a motion picture projector having an attachment for producing varying electric currents from a sound record, an exciter lamp, a transformer for supplying alternating current of the proper voltage to said lamp, a casing for said transformer, said casing forming a support for said projector and attachment, supporting legs detachably secured to said casing, a case, amplifying means for said electric currents permanently installed in said case, and means for detachably securing said case to said supporting legs.

7. In a portable sound picture apparatus, the combination of a motion picture projector having an attachment for producing varying electric currents from a sound record, an exciter lamp, a transformer for supplying alternating current of the proper voltage to said lamp, a casing for said transformer, said casing forming a support for said projector and attachment, supporting legs detachably secured to said casing, a travelling case equipped with convenient carrying means, amplifying means for said electric currents permanently installed in said case, and means for detachably securing said case to said supporting legs.

8. In a portable sound picture apparatus, the combination of a motion picture projector having an attachment for producing varying electric currents from a sound record, an exciter lamp, a transformer for supplying alternating current of the proper voltage to said lamp, a casing for said transformer, said casing forming a support for said projector and attachment, supporting leg detachably secured to said casing, a travelling case equipped with convenient carrying means, amplifying means for said electric currents permanently installed in said case, and means for detachably securing said case to said supporting legs in such manner as to stabilize said supporting legs.

WILLIAM H. BAUCH.